(12) United States Patent
Wu et al.

(10) Patent No.: US 10,788,144 B1
(45) Date of Patent: Sep. 29, 2020

(54) FLOW SWITCH OPERATED BY SINGLE BUTTON

(71) Applicant: Purity (Xiamen) Sanitary Ware Co., Ltd., Xiamen, Fujian (CN)

(72) Inventors: James Wu, Taichung (TW); Alex Wu, Taichung (TW); Ce-Wen Yang, Xiamen (CN)

(73) Assignee: PURITY (XIAMEN) SANITARY WARE CO., LTD., Xiamen (CN)

( * ) Notice: Subject to any disclaimer, the term of this patent is extended or adjusted under 35 U.S.C. 154(b) by 0 days.

(21) Appl. No.: 16/516,826

(22) Filed: Jul. 19, 2019

(51) Int. Cl.
| F16K 11/07 | (2006.01) |
| F16K 31/524 | (2006.01) |
| F16K 31/60 | (2006.01) |
| B05B 1/16 | (2006.01) |

(52) U.S. Cl.
CPC .... *F16K 31/52483* (2013.01); *F16K 11/0712* (2013.01); *F16K 31/60* (2013.01); *B05B 1/169* (2013.01)

(58) Field of Classification Search
None
See application file for complete search history.

(56) References Cited

U.S. PATENT DOCUMENTS

| 2007/0194148 A1* | 8/2007 | Rosko | B05B 1/1636 |
| | | | 239/526 |
| 2008/0105764 A1* | 5/2008 | Jianglin | B05B 1/3013 |
| | | | 239/526 |
| 2016/0091100 A1* | 3/2016 | Chen | E03C 1/08 |
| | | | 137/625 |
| 2017/0090489 A1* | 3/2017 | Chen | B05B 1/1609 |
| 2017/0333920 A1* | 11/2017 | Erickson | B05B 1/18 |
| 2019/0003165 A1* | 1/2019 | Huang | B05B 12/002 |

* cited by examiner

*Primary Examiner* — John Fox
(74) *Attorney, Agent, or Firm* — Birch, Stewart, Kolasch & Birch, LLP

(57) ABSTRACT

The present disclosure provides a flow switch operated by a single button, including a switching device and an outlet device. The switching device includes a diverter member and a switching assembly. The switching assembly includes a fixing member, a sealing member and a linking rod. The diverter member has a passing through chamber. The fixing member has a first movable chamber and a linking rod channel. The sealing member has a second movable chamber. The linking rod has a blocking flange and a sealing portion. The sealing member is used to control an inlet condition of the passing through chamber and the first movable chamber. The sealing portion is used to control an inlet condition of the linking rod channel. The blocking flange and the second movable chamber are correspondingly moved to make the sealing member and the sealing portion to be operated continuously with each other.

8 Claims, 9 Drawing Sheets

FLOW SWITCH OPERATED BY SINGLE BUTTON

BACKGROUND OF THE INVENTION

1. Technical Field

The present disclosure relates generally to a hand shower, and more particularly to a flow switch operated by a single button.

2. Description of Related Art

There are many ways to spray water in kitchen, such as shower water, sparkling water, and/or blade water. The showers of current devices are basically operated by a single button to switch two water outlet modes. With the advancement of society and the improvement of living standards, users have more and more functional requirements for showers. The showers having two water outlet modes have been difficult to meet the needs of users. To achieve more water outlet modes, it depends on installing more flow ways, which leads to increase more buttons to switch the flow ways. However, it makes the product structure being complex and bulky. When the shape and size of products are limited, it cannot meet structural requirements, and the complicated structure would lead to reduced production efficiency, and would increase the cost of production.

At least for the above reasons, the conventional switch still have room for improvements.

BRIEF SUMMARY OF THE INVENTION

In view of the above, the primary objective of the present disclosure is to provide a flow switch operated by a single button which could switch three outlet modes by the single button, in order to provide products having smaller structure, whereby to reduce a volume of the products, and to decrease the cost of production.

The present disclosure provides a flow switch operated by a single button. The flow switch operated by a single button includes a switching device and an outlet device. The outlet device is installed at an outlet end of the switching device. The switching device includes a diverter member and a switching assembly. The diverter member has a passing through chamber, and the switching assembly is correspondingly positioned in the passing through chamber. The diverter member has a first inlet channel positioned at an inlet end of the diverter member, and the diverter member has a first outlet channel, a second outlet channel and a third outlet channel positioned at an outlet end of the diverter member. The passing through chamber has a first inlet opening, a first outlet opening, a second outlet opening and a third outlet opening positioned at a side wall of the passing through chamber. The first outlet opening, the second outlet opening, the first inlet opening and the third outlet opening are sequentially arranged on an inner wall of the passing through chamber in an axial direction of the passing through chamber. The first outlet opening is close to a hole of the passing through chamber. The third outlet opening is close to a bottom of the passing through chamber. The first inlet opening communicates with the first inlet channel, the first outlet opening communicates with the first outlet channel, the second outlet opening communicates with the second outlet channel, and the third outlet opening communicates with the third outlet channel.

The switching assembly includes a fixing member, a sealing member and a linking rod. The fixing member is correspondingly positioned to seal between the hole of the passing through chamber and the first inlet opening, and to block the first outlet opening and the second opening. The fixing member has a first movable chamber and a linking rod channel communicating with each other. A hole size of the first movable chamber is greater than that of the linking rod channel. The first movable chamber has a fourth outlet opening which is positioned at a bottom of the first movable chamber and communicates with the linking rod channel, and has a fifth outlet opening which is positioned at a side wall of the first movable chamber and communicates with the second outlet opening. The linking rod channel has a sixth outlet opening which is positioned at a side wall of the linking rod channel and communicates with the first outlet opening. A hole of the first movable chamber faces the bottom of the passing through chamber. The sealing member is movably fits to seal the side wall of the first movable chamber and the side wall of the passing through chamber, and is positioned between the fifth outlet opening and the bottom of the passing through chamber. A first return spring is positioned between the sealing member and the bottom of the passing through chamber.

The linking rod movably passes through the linking rod channel. The sealing member has a second movable chamber. The linking rod has a blocking flange which is positioned at one end of the linking rod and is movably and correspondingly positioned in the second movable chamber. A first restrain member is fixed at a hole of the second movable chamber, in order to prevent the blocking flange from leaving from the second movable chamber. A second return spring is positioned between the blocking flange and a bottom of the second movable chamber. The linking rod has a sealing portion positioned at a mid-section of the linking rod, and the sealing portion is operably moved along with the movement of the linking rod to correspondingly seal the fourth outlet opening.

According to embodiments of the present disclosure, a longitudinal direction of the linking rod channel and a longitudinal direction of the first movable chamber are positioned in the axial direction of the passing through chamber.

According to embodiments of the present disclosure, another end of the linking rod is connected to a button which could improve operating feel.

According to embodiments of the present disclosure, a first sealing ring is sleeved around an outside of the sealing member; the first sealing ring movably fits to seal the side wall of the first movable chamber and the side wall of the passing through chamber, and is positioned between the fifth outlet opening and the bottom of the passing through chamber.

According to embodiments of the present disclosure, a second sealing ring is sleeved around an outside of the sealing member; the second sealing ring movably and correspondingly fits to seal the fourth outlet opening.

According to embodiments of the present disclosure, at least one third sealing ring is sleeved around an outside of the fixing member; the at least one third sealing ring correspondingly fits to seal between the outside of the fixing member and the side wall of the passing through chamber.

According to embodiments of the present disclosure, a second restrain member is fixed at the hole of the passing through chamber, in order to prevent the fixing member from leaving from the passing through chamber.

According to embodiments of the present disclosure, the outlet device comprises a first outlet chamber, a second outlet chamber and a third outlet chamber respectively corresponding to the first outlet channel, the second outlet channel and the third outlet channel; the first outlet channel communicates with the first outlet chamber, the second outlet channel communicates with the second outlet chamber, and the second outlet channel communicates with the first outlet chamber; an outlet mode of the first outlet chamber, an outlet mode of the second outlet chamber and an outlet mode of the third outlet chamber are different from each other.

Through the mentioned structure, an outlet opening of the passing through chamber and an outlet opening of the first movable chamber could be switched to outlet by the movable sealing member and the movable sealing portion in the present disclosure. Through the continuous operation of the sealing member and the sealing portion, three outlet modes could be switched by a single button, whereby to provide products having smaller structure, so as to reduce a volume of the products, and to decrease the cost of production.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
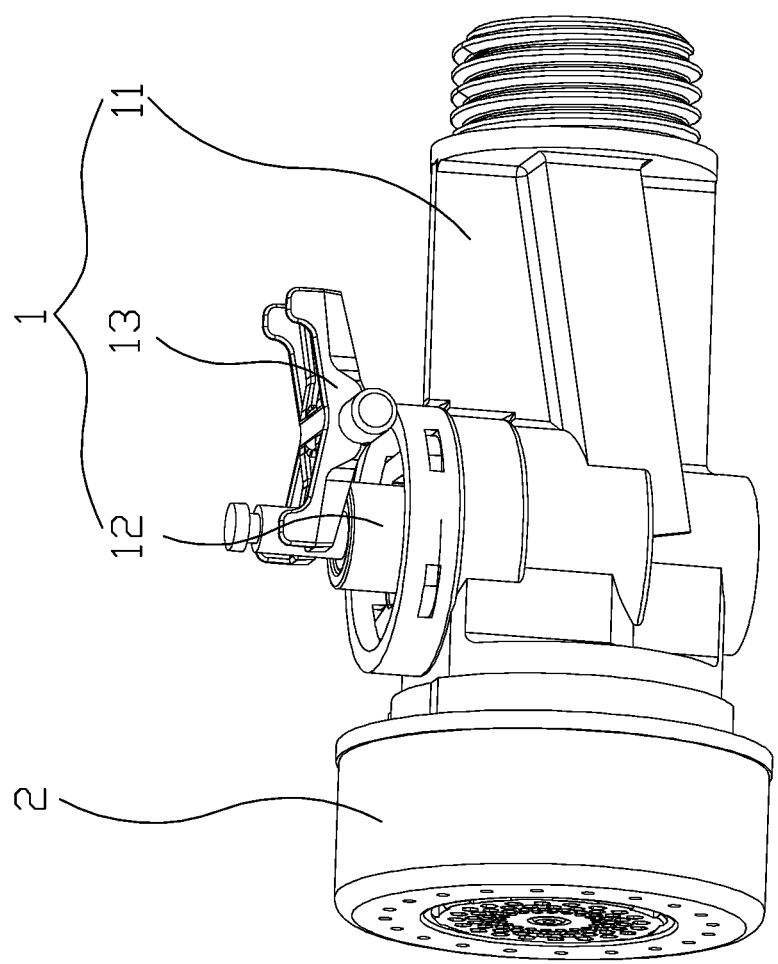
FIG. 1 is a perspective view of one embodiment of the present disclosure.

In order to illustrate the present disclosure more clearly, the preferred embodiments and the accompanying drawings are described in detail below.

As illustrated in FIG. 1 to FIG. 9, in one preferred embodiment of the present disclosure, a flow switch operated by a single button 1 includes a switching device 1 and an outlet device 2. The outlet device 2 is installed at an outlet end of the switching device 1. In embodiments of the present disclosure, three outlet modes could be switched through operating the switching device 1 to control the three outlet modes of three flow ways in the flow switch.

As shown in FIG. 3 to FIG. 6, the switching device 1 includes a diverter member 11, a switching assembly 12 and a button 13. The diverter member 11 has a passing through chamber 111, and the switching assembly 12 is correspondingly positioned in the passing through chamber 111. The diverter member 11 has a first inlet channel 112 positioned at an inlet end of the diverter member 11, and the diverter member 11 has a first outlet channel 113, a second outlet channel 114 and a third outlet channel 115 positioned at an outlet end of the diverter member 11. The passing through chamber 111 has a first inlet opening 1111, a first outlet opening 1112, a second outlet opening 1113 and a third outlet opening 1114 positioned at a side wall of said passing through chamber 111. The first outlet opening 1112, the second outlet opening 1113, the first inlet opening 1111 and the third outlet opening 1114 are sequentially arranged on an inner wall of the passing through chamber 111 in an axial direction of the passing through chamber 111. The first outlet opening 1112 is close to a hole of the passing through chamber 111. The third outlet opening 1114 is close to a bottom of the passing through chamber 111. The first inlet opening 1111 communicates with the first inlet channel 112, the first outlet opening 1112 communicates with the first outlet channel 113, the second outlet opening 1113 communicates with the second outlet channel 114, and the third outlet opening 1114 communicates with the third outlet channel 115.

The switching assembly 12 includes a fixing member 121, a sealing member 122 and a linking rod 123. The fixing member 121 is correspondingly positioned to seal between the hole of the passing through chamber 111 and the first inlet opening 1111, and to block the first outlet opening 1112 and the second opening 1113. The fixing member 121 has a first movable chamber 1211 and a linking rod channel 1212 communicating with each other. A hole size of the first movable chamber 1211 is greater than that of the linking rod channel 1212. The first movable chamber 1211 has a fourth outlet opening 1213 which is positioned at a bottom of the first movable chamber 1211 and communicates with the linking rod channel 1212, and has a fifth outlet opening 1214 which is positioned at a side wall of the first movable chamber 1211 and communicates with the second outlet opening 1113. The linking rod channel 1212 has a sixth outlet opening 1215 which is positioned at a side wall of the linking rod channel 1212 and communicates with the first outlet opening 1112. A longitudinal direction of the linking rod channel 1212 and a longitudinal direction of the first movable chamber 1211 are positioned in the axial direction of the passing through chamber 111. A hole of the first movable chamber 1211 faces the bottom of the passing through chamber 111.

Said sealing member 122 is movably fits to seal the side wall of the first movable chamber 1211 and the side wall of the passing through chamber 111, and is positioned between the fifth outlet opening 1214 and the bottom of the passing through chamber 111. A first return spring 14 is positioned between the sealing member 122 and the bottom of the passing through chamber 111.

Said linking rod 123 movably passes through the linking rod channel 1212. The sealing member 122 has a second movable chamber 1221. The linking rod 123 has a blocking flange 1231 which is positioned at one end of the linking rod 123 and is movably and correspondingly positioned in the second movable chamber 1221. A first restrain member 124 is fixed at a hole of the second movable chamber 1221, in order to prevent the blocking flange 1231 from leaving from the second movable chamber 1221. A second return spring 125 is positioned between the blocking flange 1231 and a bottom of the second movable chamber 1221. The linking rod 123 has a sealing portion 1232 positioned at a mid-section of the linking rod 123, and the sealing portion 1232 is operably moved along with the movement of the linking rod 123 to correspondingly seal the fourth outlet opening 1213.

According to embodiments of the present disclosure, another end of the linking rod 123 is connected to the button 13 which could improve operating feel.

In order to increase the sealing property of products, to utilize various materials on each units easily, and to increase the stability of structures, a first sealing ring 126 is sleeved around an outside of said sealing member 122. The first sealing ring 126 movably fits to seal the side wall of the first movable chamber 1211 and the side wall of the passing through chamber 111, and is positioned between the fifth outlet opening 1214 and the bottom of the passing through chamber 111. According to embodiments of the present disclosure, a second sealing ring 127 is sleeved around an outside of the sealing member 1232. The second sealing ring 127 movably and correspondingly fits to seal the fourth outlet opening 1213. According to embodiments of the present disclosure, at least one third sealing ring 128 is sleeved around an outside of the fixing member 121. The at least one third sealing ring 128 correspondingly fits to seal between the outside of the fixing member 121 and the side wall of the passing through chamber 111.

According to embodiments of the present disclosure, a second restrain member 15 is fixed at the hole of the passing through chamber 111, in order to prevent the fixing member 121 from leaving from the passing through chamber 111.

Figure 2:
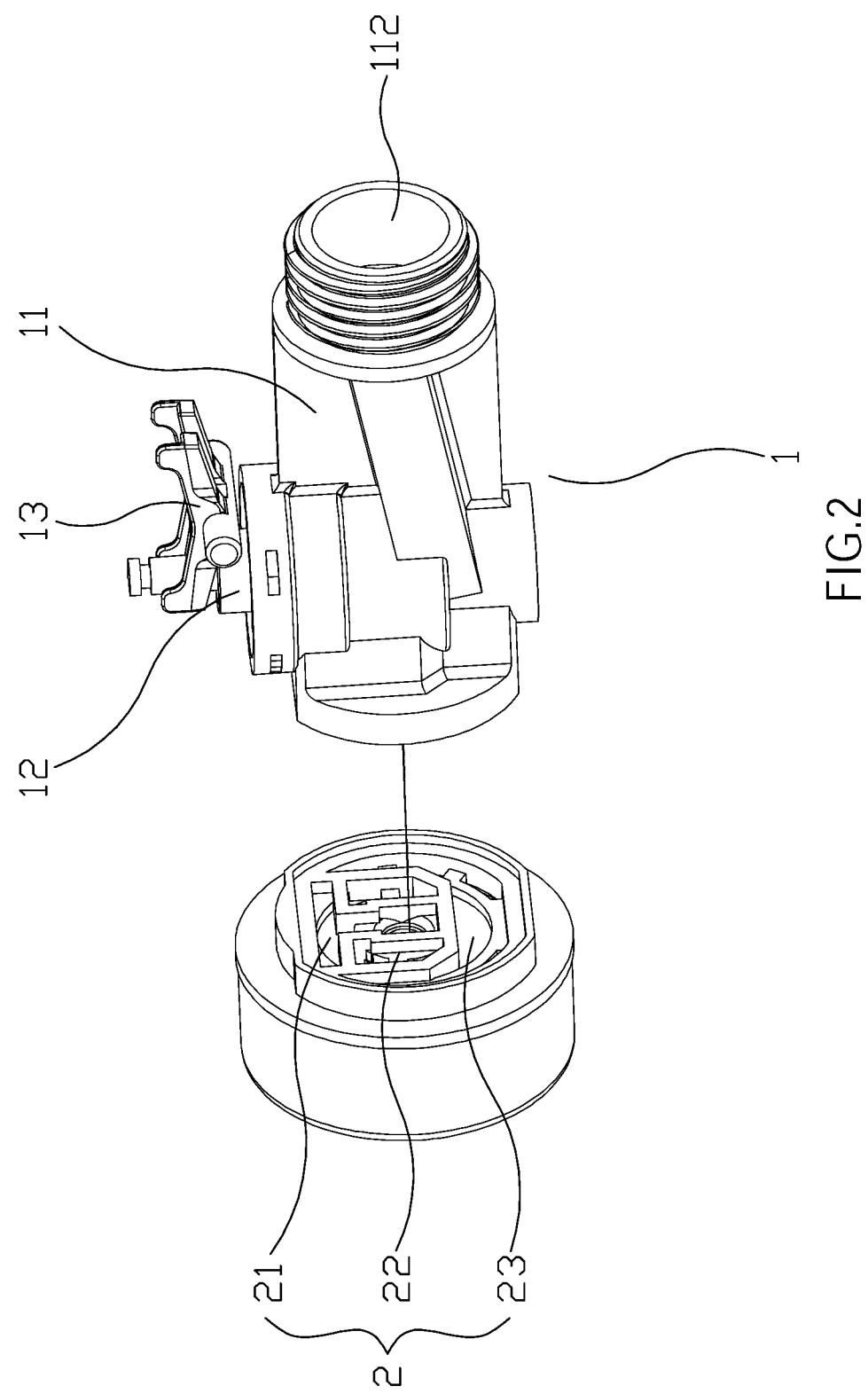
FIG. 2 is a partial exploded view of one embodiment of the present disclosure.
Figure 3:
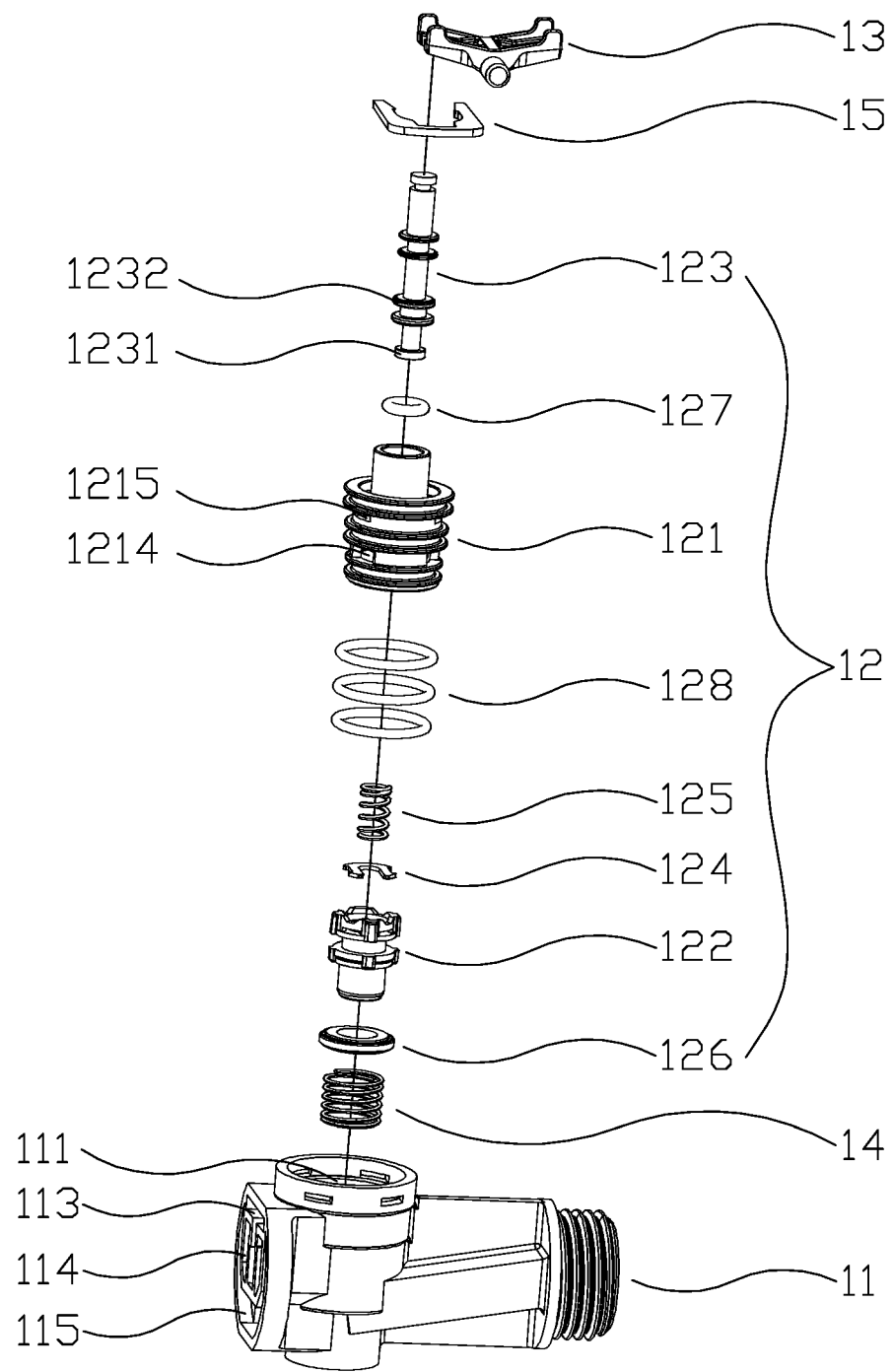
FIG. 3 is an exploded view of a switching device of one embodiment of the present disclosure.
Figure 4:
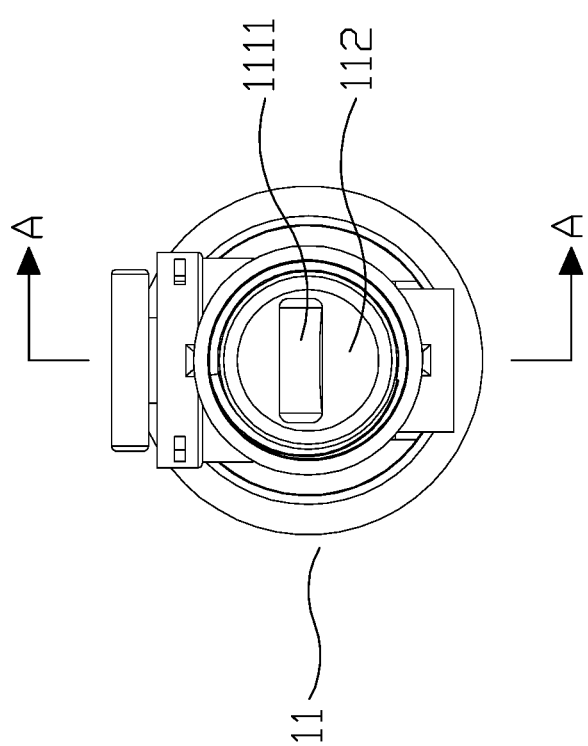
FIG. 4 is a front view of a diverter member of one embodiment of the present disclosure.

As shown in FIG. 2, said outlet device 2 includes a first outlet chamber 21, a second outlet chamber 22 and a third outlet chamber 23 respectively corresponding to the first outlet channel 113, the second outlet channel 114 and the third outlet channel 115. The first outlet channel 113 communicates with the first outlet chamber 21, the second outlet channel 114 communicates with the second outlet chamber 22, and the second outlet channel 114 communicates with the first outlet chamber 21. An outlet mode of the first outlet chamber 21, an outlet mode of the second outlet chamber 22 and an outlet mode of the third outlet chamber 23 are different from each other.

Figure 5:
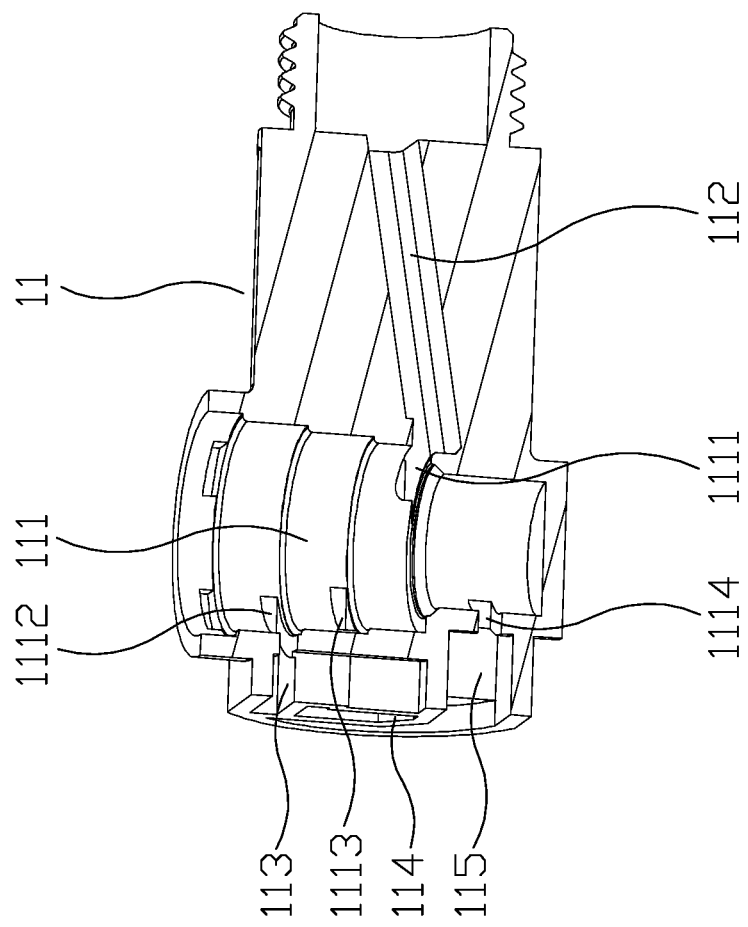
FIG. 5 is a cross-sectional view of FIG. 3 taken along with A-A line.
Figure 6:
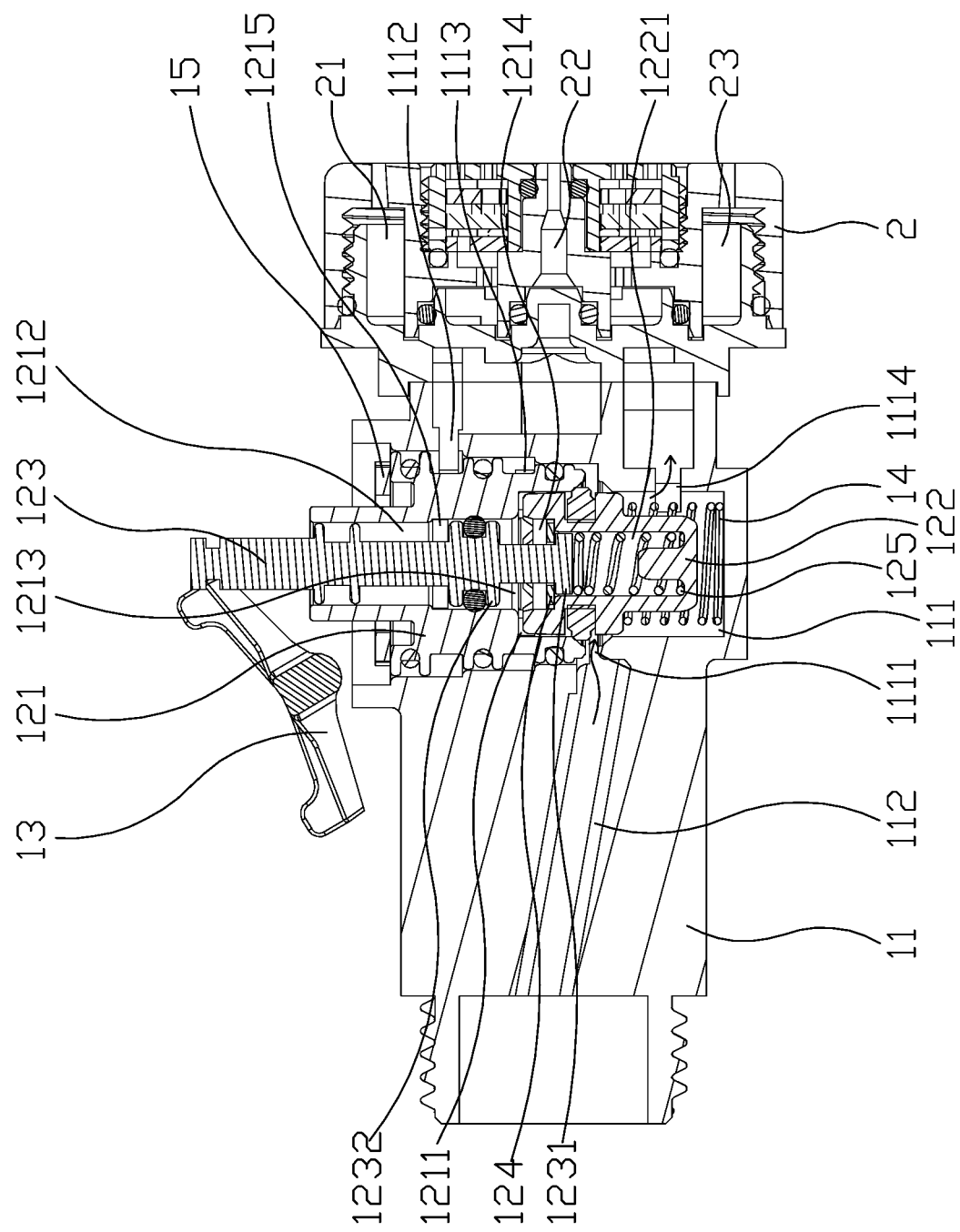
FIG. 6 is a schematic view of the switching device of one embodiment of the present disclosure, wherein the switching device is in a first outlet mode (an initiation state)

Referring to FIG. 5 and FIG. 6, when the switching assembly 12 is in an initiation state, the first return spring 14 abuts against the sealing member 122, i.e., the first sealing ring 126, whereby the sealing member 122 could fits to seal between the first inlet opening 1111 and the fifth outlet opening 1214. The second return spring 125 abuts against the blocking flange 1231, whereby to correspondingly seal the fourth outlet opening 1213 with the sealing portion 1232, i.e., the second sealing ring 127, at the first restrain member 124. At that time, water flows through the first inlet channel 112 into the diverter member 11, and flows through the first inlet opening 1111 into the passing through chamber 111, and flows through the third outlet opening 1114 into the third outlet channel 115, so as to outlet from the third outlet chamber 23. When the hole of the first movable chamber 1211 is blocked by the sealing member 122, water cannot flow into the first movable chamber 1211 and the linking rod channel 1212, whereby the first outlet channel 113 and the second outlet channel 114 cannot outlet water, so that a first outlet mode is provided. The first outlet mode is that, the third outlet channel 115 could outlet water, but the first outlet channel 113 and the second outlet channel 114 cannot outlet water. In other words, the third outlet chamber 23 could outlet water, but the first outlet chamber 21 and the second outlet chamber 22 cannot outlet water. The first outlet mode is an initiation state.

Figure 7:
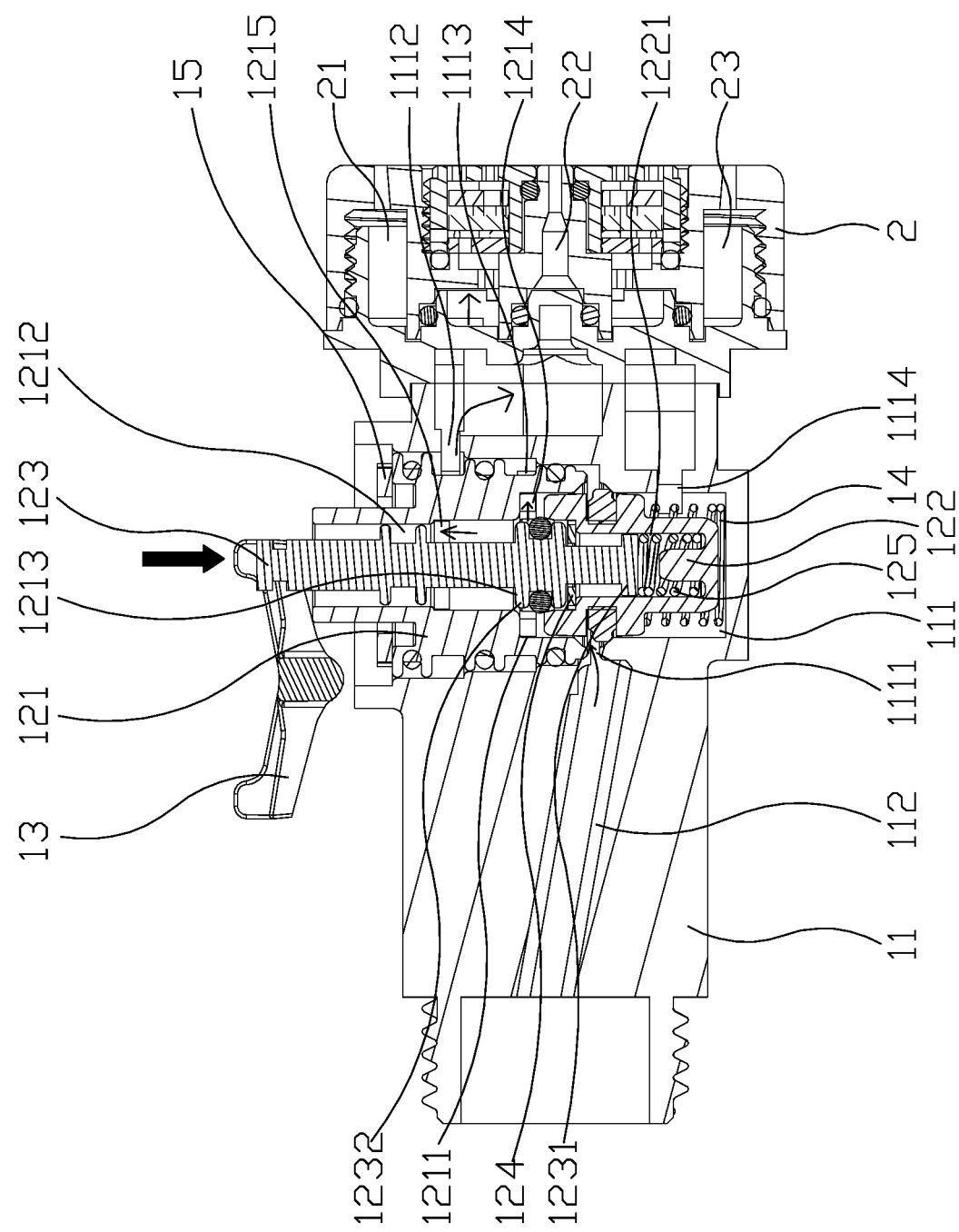
FIG. 7 is a schematic view of the switching device of one embodiment of the present disclosure, wherein the switching device is switched to a second outlet mode.

Referring to FIG. 5 and FIG. 7, when the button 13 is operated manually, and the other end of the linking rod 123 is pressed, the linking rod 123 is moved toward the sealing member 122, so that the sealing portion 1232 is moved away from the fourth outlet opening 1213. One end of the linking rod 123 is moved toward the bottom of the second movable chamber 1221 and compresses the second return spring 125, the second return spring 125 abuts against the bottom of the second movable chamber 1221, whereby the sealing member 122 is moved toward the bottom of the passing through chamber 111, and the sealing member 122 could fit to seal between the first inlet opening 1111 and the bottom of the passing through chamber 111. At the moment, water flows through the first inlet channel 112 into the diverter member 11, and flows through the first inlet opening 1111 into the passing through chamber 111, and flows into the first movable chamber 1211, and diverts in the first movable chamber 1211. Part of water flows through the fourth outlet opening 1213 into the linking rod channel 1212, and sequentially flows through the sixth outlet opening 1215 and the first outlet opening 1112 into the first outlet channel 113, whereby water could outlet from the first outlet channel 113. Another part of water sequentially flows through the fifth outlet opening 1214 and the second outlet opening 1113 into the second outlet channel 114, whereby water could outlet from the second outlet channel 114. When the first inlet opening 1111 and the bottom of the passing through chamber 111 are blocked by the sealing member 122, water cannot flow through the third outlet opening 1114, whereby third outlet opening 1114 cannot outlet water, so that a second outlet mode is provided. The second outlet mode is that, the first outlet channel 113 and the second outlet channel 114 could outlet water, but the third outlet channel 115 cannot outlet water. In other words, the first outlet chamber 21 and the second outlet chamber 22 could outlet water, but third outlet chamber 23 cannot outlet water. The second outlet mode needs to be maintained by continuously press the other end of the linking rod 123. In the operation, for the cooperation of water pressure and the second return spring 125, the sealing member 122 always fits to seal between the first inlet opening 1111 and a bottom of the passing through chamber 111, in order to keep water flowing into the first movable chamber 1211.

Figure 8:
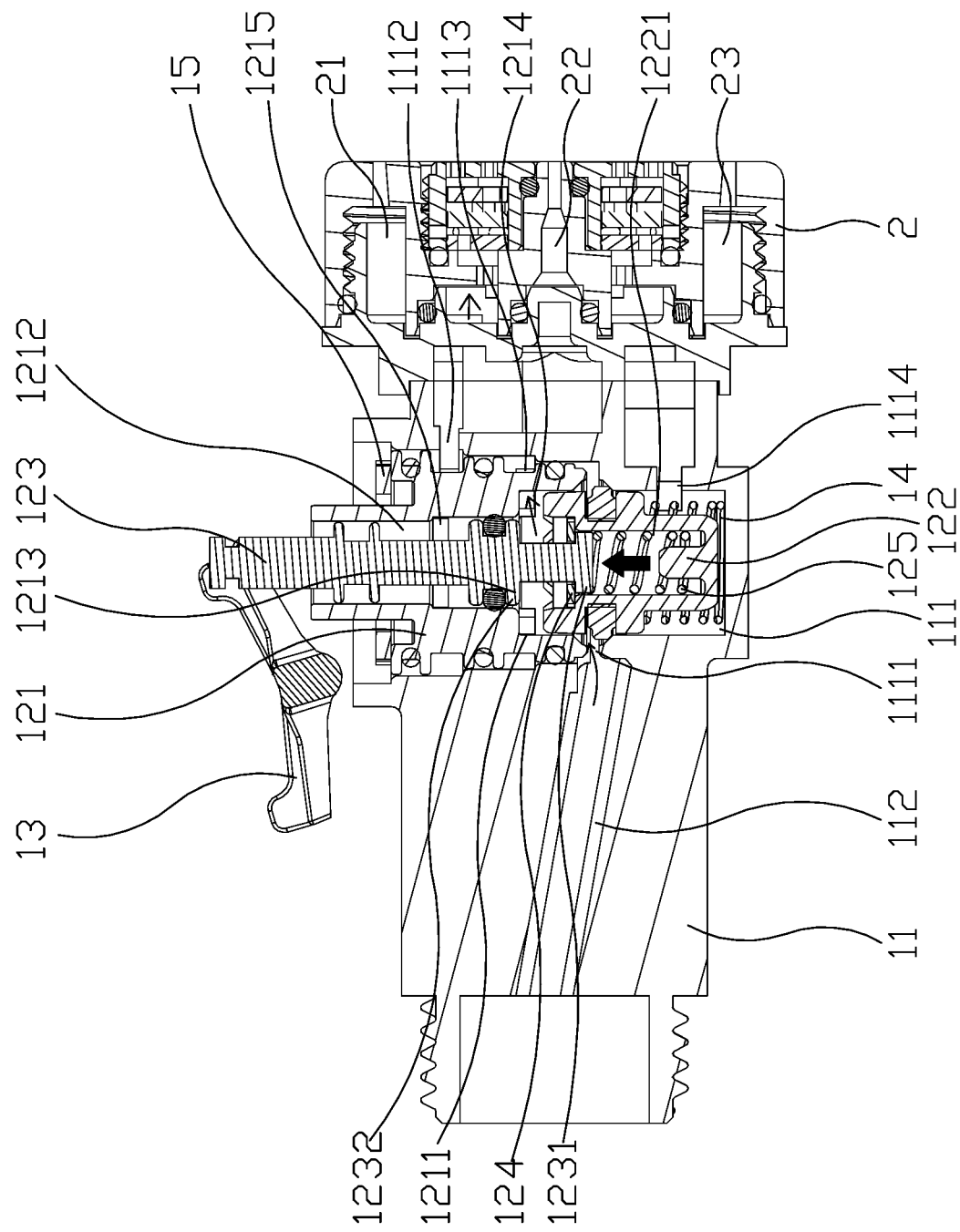
FIG. 8 is a schematic view of the switching device of one embodiment of the present disclosure, wherein the switching device is switched to a third outlet mode.

Referring to FIG. 5 and FIG. 8, when the button 13 is no longer operated, and the other end of the linking rod 123 is no longer pressed, the second return spring 125 abuts against the blocking flange 1231 to move, so that the linking rod 123 is moved away from the sealing member 122 in the axial direction of the hole of the linking rod 123 at the first restrain member 124, the sealing portion 1232 fits to seal the fourth outlet opening 1213. For the cooperation of water pressure and the second return spring 125, the sealing member 122 keeps fitting to seal between the first inlet opening 1111 and a bottom of the passing through chamber 111. At the moment, water flows through the first inlet channel 112 into the diverter member 11, and flows through the first inlet opening 1111 into the passing through chamber 111, and flows into the first movable chamber 1211, and sequentially flows through the fifth outlet opening 1214 and the second outlet opening 1113 into the second outlet channel 114, whereby water could outlet from the second outlet channel 114. When the first inlet opening 1111 and the bottom of the passing through chamber 111 are blocked by the sealing member 122, water cannot flow through the third outlet opening 1114, whereby third outlet opening 1114 cannot outlet water. Further, the fourth outlet opening 1213 is blocked by the sealing portion 1232, so that water cannot flow through the first outlet opening 1112, and the first outlet channel 113 cannot outlet water, whereby a third outlet mode is provided. The third outlet mode is that, the second outlet channel 114 could outlet water, but the first outlet channel 113 and the third outlet channel 115 cannot outlet water. In other words, the second outlet chamber 22 could outlet water, but the first outlet chamber 21 and the third outlet chamber 23 cannot outlet water. Accordingly, by pressing and releasing the button 13 to move the linking rod 123, the second outlet mode and the third outlet mode could be switched.

Figure 9:
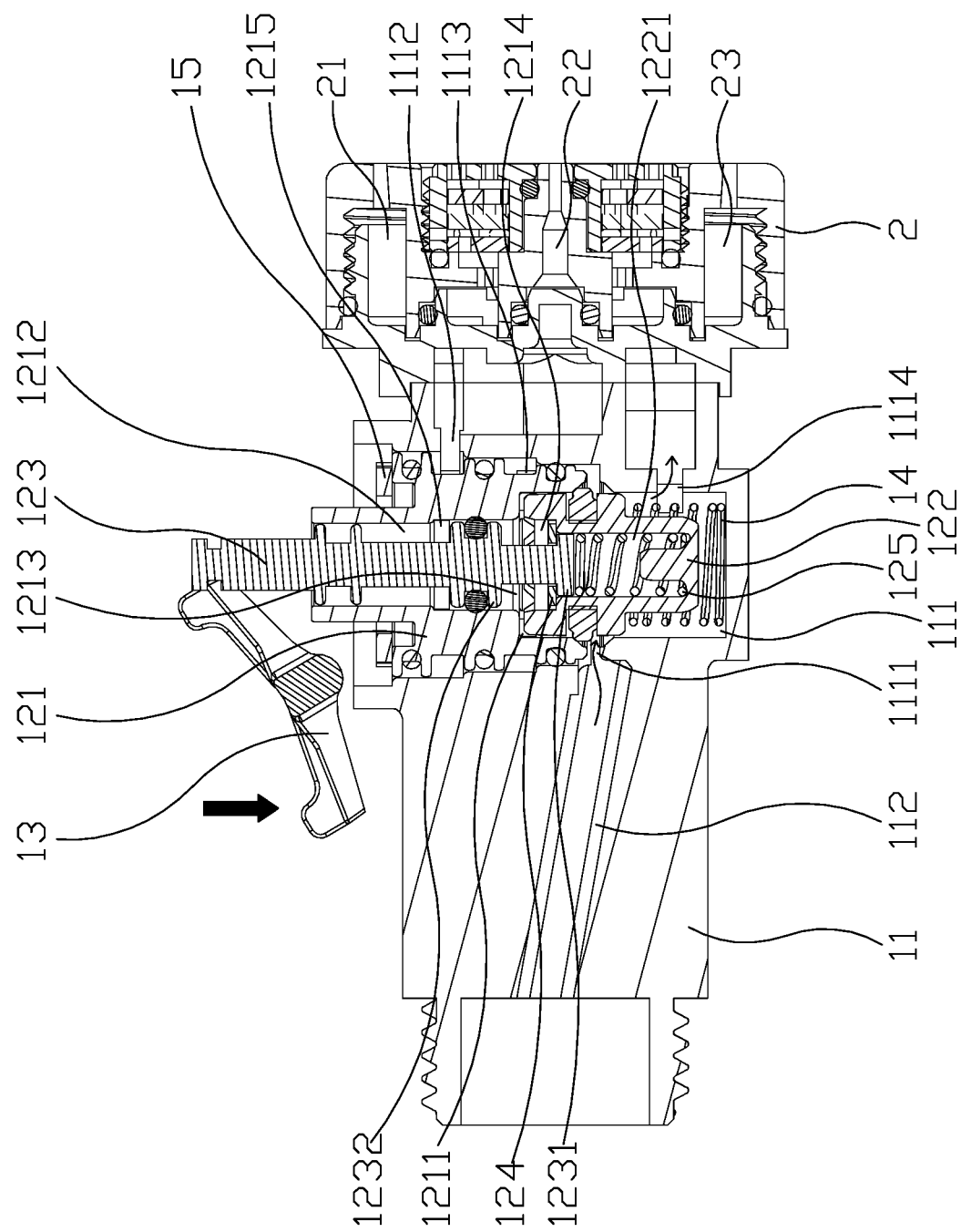
FIG. 9 is a schematic view of the switching device of one embodiment of the present disclosure, wherein the switching device is switched to the first outlet mode.

Referring to FIG. 5 and FIG. 9, when it needs to switch to the first outlet mode, the button 13 is operated manually, and the other end of the linking rod 123 is pulled, the linking rod 123 is moved away from the sealing member 122, so that the sealing portion 1232 is moved away from the bottom of the passing through chamber 111. For the first restrain member 124 prevents the blocking flange 1231 from leaving from the second movable chamber 1221, the linking rod 123 drives the sealing member 122 to move away from the bottom of the passing through chamber 111, whereby the sealing portion 1232 is returned to fit to seal between the first inlet opening 1111 and the fifth outlet opening 1214. In other words, the switching assembly 12 is returned to the initiation state, whereby to switch to the first outlet mode. In addition, when no water flows into the switching assembly 12, the first return spring 14 could drive the sealing member 122 to return.

Through the mentioned structure, an outlet opening of the passing through chamber 111 and an outlet opening of the first movable chamber 1211 could be switched to outlet by the movable sealing member 122 and the movable sealing portion 1232 in the present disclosure. The sealing member 122 and the sealing portion 1232 could be operated continuously through the linking rod 123, three outlet modes could be switched by the single button 13, whereby to provide products having smaller structure, so as to reduce a volume of the products, and to decrease the cost of production.

It must be pointed out that the embodiments described above are only some preferred embodiments of the present disclosure. All equivalent structures which employ the concepts disclosed in this specification and the appended claims should fall within the scope of the present disclosure.

What is claimed is:

1. A flow switch operated by a single button, comprising a switching device and an outlet device, the outlet device is installed at an outlet end of the switching device; characterized in that: the switching device comprises a diverter member and a switching assembly; the diverter member has a passing through chamber, and the switching assembly is correspondingly positioned in the passing through chamber; the diverter member has a first inlet channel positioned at an inlet end of the diverter member, and the diverter member has a first outlet channel, a second outlet channel and a third outlet channel positioned at an outlet end of the diverter member; the passing through chamber has a first inlet opening, a first outlet opening, a second outlet opening and a third outlet opening positioned at a side wall of the passing through chamber, the first outlet opening, the second outlet opening, the first inlet opening and the third outlet opening are sequentially arranged on an inner wall of the passing through chamber in an axial direction of the passing through chamber, the first outlet opening is close to a hole of the passing through chamber, the third outlet opening is close to a bottom of the passing through chamber; the first inlet opening communicates with the first inlet channel, the first outlet opening communicates with the first outlet channel, the second outlet opening communicates with the second outlet channel, and the third outlet opening communicates with the third outlet channel;

the switching assembly comprises a fixing member, a sealing member and a linking rod; the fixing member is correspondingly positioned to seal between the hole of the passing through chamber and the first inlet opening, and to block the first outlet opening and the second opening; the fixing member has a first movable chamber and a linking rod channel communicating with each other, a hole size of the first movable chamber is greater than that of the linking rod channel; the first movable chamber has a fourth outlet opening which is positioned at a bottom of the first movable chamber and communicates with the linking rod channel, and has a fifth outlet opening which is positioned at a side wall of the first movable chamber and communicates with the second outlet opening; the linking rod channel has a sixth outlet opening which is positioned at a side wall of the linking rod channel and communicates with the first outlet opening; a hole of the first movable chamber faces the bottom of the passing through chamber; the sealing member is movably fits to seal the side wall of the first movable chamber and the side wall of the passing through chamber, and is positioned between the fifth outlet opening and the bottom of the passing through chamber; a first return spring is positioned between the sealing member and the bottom of the passing through chamber;

the linking rod movably passes through the linking rod channel, the sealing member has a second movable chamber, the linking rod has a blocking flange which is positioned at one end of the linking rod and is movably and correspondingly positioned in the second movable chamber, and a first restrain member is fixed at a hole of the second movable chamber, in order to prevent the blocking flange from leaving from the second movable chamber; a second return spring is positioned between the blocking flange and a bottom of the second movable chamber; the linking rod has a sealing portion positioned at a mid-section of the linking rod, and the sealing portion is operably moved along with the movement of the linking rod to correspondingly seal the fourth outlet opening.

2. The flow switch operated by a single button of claim 1, wherein a longitudinal direction of the linking rod channel and a longitudinal direction of the first movable chamber are positioned in the axial direction of the passing through chamber.

3. The flow switch operated by a single button of claim 1, wherein another end of the linking rod is connected to a button which could improve operating feel.

4. The flow switch operated by a single button of claim 1, wherein a first sealing ring is sleeved around an outside of the sealing member, the first sealing ring movably fits to seal the side wall of the first movable chamber and the side wall of the passing through chamber, and is positioned between the fifth outlet opening and the bottom of the passing through chamber.

5. The flow switch operated by a single button of claim 1, wherein a second sealing ring is sleeved around an outside of the sealing member, the second sealing ring movably and correspondingly fits to seal the fourth outlet opening.

6. The flow switch operated by a single button of claim 1, wherein at least one third sealing ring is sleeved around an outside of the fixing member, the at least one third sealing ring correspondingly fits to seal between the outside of the fixing member and the side wall of the passing through chamber.

7. The flow switch operated by a single button of claim 1, wherein a second restrain member is fixed at the hole of the passing through chamber, in order to prevent the fixing member from leaving from the passing through chamber.

8. The flow switch operated by a single button of claim 1, wherein the outlet device comprises a first outlet chamber, a second outlet chamber and a third outlet chamber respectively corresponding to the first outlet channel, the second outlet channel and the third outlet channel; the first outlet channel communicates with the first outlet chamber, the second outlet channel communicates with the second outlet chamber, the second outlet channel communicates with the first outlet chamber; an outlet mode of the first outlet chamber, an outlet mode of the second outlet chamber and an outlet mode of the third outlet chamber are different from each other.

\* \* \* \* \*